US010486989B2

(12) United States Patent
Cole (10) Patent No.: US 10,486,989 B2
(45) Date of Patent: Nov. 26, 2019

(54) ELECTROCHLORINATION APPARATUS (71) Applicant: GAFFEY TECHNICAL SERVICES LIMITED, Accrington, Lancashire (GB)

(72) Inventor: Maxwell Cole, Accrington (GB)

(73) Assignee: GAFFEY TECHNICAL SERVICES LIMITED, Accrington, Lancashire (GB)

( * ) Notice: Subject to any disclaimer, the term of this patent is extended or adjusted under 35 U.S.C. 154(b) by 167 days.

(21) Appl. No.: 15/324,121

(22) PCT Filed: Jul. 3, 2015

(86) PCT No.: PCT/GB2015/000207
§ 371 (c)(1),
(2) Date: Jan. 5, 2017

(87) PCT Pub. No.: WO2016/009166
PCT Pub. Date: Jan. 21, 2016

(65) Prior Publication Data
US 2017/0225977 A1 Aug. 10, 2017

(30) Foreign Application Priority Data
Jul. 16, 2014 (GB) .................................. 1412661.9

(51) Int. Cl.
C02F 1/467 (2006.01)
C25B 15/02 (2006.01)
(Continued)

(52) U.S. Cl.
CPC ........ *C02F 1/4674* (2013.01); *C02F 1/46104* (2013.01); *C25B 1/26* (2013.01);
(Continued)

(58) Field of Classification Search
None
See application file for complete search history.

(56) References Cited

U.S. PATENT DOCUMENTS 4,085,028 A * 4/1978 McCallum .......... C02F 1/46109
204/268
4,136,005 A 1/1979 Persson et al.
(Continued)

FOREIGN PATENT DOCUMENTS

DE 29722822 U1 2/1998
DE 102012103609 A1 10/2013
(Continued)

OTHER PUBLICATIONS

Kraft et al, Electrochemical water disinfection Part I: Hypochlorite production from very dilute chloride solutions, Journal of Applied Electrochemistry, vol. 29, No. 7, Jul. 1999, pp. 859-866 (Year: 1999).*

(Continued)

*Primary Examiner* — Harry D Wilkins, III
(74) *Attorney, Agent, or Firm* — Egbert Law Offices, PLLC (57) ABSTRACT An electrochlorination apparatus is provided for generating a sodium hypochlorite solution. The apparatus includes an electrolytic cell and a brine tank that is located above the electrolytic cell. The brine tank is adapted to supply a predetermined volume of a saturated brine solution to the cell via a gravity feed. A flow meter is provided for connection to a water supply and adapted to supply water to the electrolytic cell via a valve. A controller controls operation of the valve whereby a predetermined volume of water as measured by the flow meter is also supplied to the cell in (Continued)

combination with the brine solution so that the cell operates to produce a sodium hypochlorite solution of a predetermined concentration.

19 Claims, 7 Drawing Sheets (51) Int. Cl.
*C25B 15/08* (2006.01)
*C25B 1/26* (2006.01)
*C25B 9/00* (2006.01)
*C02F 1/461* (2006.01)

(52) U.S. Cl.
CPC ............. *C25B 9/00* (2013.01); *C25B 15/02* (2013.01); *C25B 15/08* (2013.01); *C02F 2201/4617* (2013.01); *C02F 2201/46135* (2013.01); *C02F 2201/46145* (2013.01)

(56) References Cited

U.S. PATENT DOCUMENTS

| 4,329,215 | A | | 5/1982 | Scoville | |
|---|---|---|---|---|---|
| 4,510,026 | A | * | 4/1985 | Spaziante | C02F 1/46104 205/338 |
| 5,160,596 | A | * | 11/1992 | Keller, Jr. | C02F 1/4674 204/266 |
| 5,643,425 | A | * | 7/1997 | Amano | B01F 1/0033 204/279 |
| 7,402,252 | B2 | * | 7/2008 | Kadlec | C02F 1/76 210/192 |
| 2002/0108865 | A1 | * | 8/2002 | Bryan | C25B 1/26 205/556 |
| 2007/0207053 | A1 | * | 9/2007 | Doyle | C01D 3/04 422/14 |
| 2007/0251831 | A1 | * | 11/2007 | Kaczur | C25B 1/46 205/510 |
| 2009/0283417 | A1 | | 11/2009 | Sanchez et al. | |
| 2011/0240486 | A1 | * | 10/2011 | Yoshida | C25B 1/04 205/744 |

FOREIGN PATENT DOCUMENTS

| GB | 2393737 A | 4/2004 |
|---|---|---|
| JP | 2000265289 A | 9/2000 |
| WO | 2008032946 A1 | 3/2008 |
| WO | 2008035868 A1 | 3/2008 |
| WO | 2012019016 A2 | 2/2012 |

OTHER PUBLICATIONS

International Search Report for corresponding International Application No. PCT/GB2015/000207.

Search Report for corresponding UK Patent Application No. GB1412661.9.

* cited by examiner

ELECTROCHLORINATION APPARATUS

The present invention relates to an electrochlorination apparatus for use in water treatment and, in particular, to an electrochlorination apparatus for use on site to supply chlorinated water by generation of a sodium hypochlorite solution.

Sodium hypochlorite solutions are used in water treatment as a disinfectant. For example, a 12% solution is widely used in waterworks for the chlorination of water, and a 5% solution is used for the disinfection of waste water in treatment plants. The present invention relates to an apparatus for generating a sodium hypochlorite solution that is primarily, but not exclusively, for use in swimming pools, in the primary and secondary disinfection of potable and private water supplies, and in other applications such as CIP (clean in place) sterilisation in dairies, breweries, the pharmaceutical industry, and the disinfection of food washing and in cooling tower biocide treatments.

Conventional apparatus used to generate a sodium hypochlorite solution operates using electrochlorination wherein an electric current is run through brine in an electrolytic cell wherein a sodium hypochlorite solution and hydrogen gas are generated by electrolysis. The reaction is a two-part process. The initial reaction produces sodium hydroxide (NaOH), chlorine gas ($Cl_2$) and hydrogen gas ($H_2$). The sodium hydroxide (NaOH) and chlorine gas ($Cl_2$) then react to produce sodium hypochlorite (NaClO), sodium chloride (NaCl) and water ($H_2O$). The hydrogen gas ($H_2$) production is a by-product and is vented away.

Initial Production Reaction: $2NaCl + 2H_2O \rightarrow 2NaOH + Cl_2 + H_2$ (hydrogen is vented away)

Secondary Production Reaction $2NaOH + Cl_2 \leftrightarrow NaClO + NaCl + H_2O$ The generated sodium hypochlorite solution has a pH value between 8 and 8.5 and once it is dosed into a water flow it reacts to produce the active disinfectant, hypochlorous acid (HOCl) and sodium hydroxide (NaOH).

Active Disinfection Reaction $NaClO + H_2O \leftrightarrow HOCl + NaOH$

Dosing amounts required typically depend upon local authority regulations and the application.

In most conventional apparatus a regulated water flow is pumped into an electrolytic cell or a bank of such cells and brine is introduced into the regulated water flow prior to entry into the electrolytic cell or cells. Sodium hypochlorite is therefore continuously produced. The brine, being a saturated salt solution, is pumped using a dosing pump so that the correct quantities of brine and water are fed to the electrolyser cell to produce a sodium hypochlorite solution of the required concentration. Overall, the apparatus requires a relatively large space to accommodate it.

The object of the present invention is to provide a scaled-down apparatus for use in applications where there is a space constraint and to remove the requirement for a dosing pump to pump the brine to the electrolytic cell.

According to the present invention there is provided an electrochlorination apparatus for generating a sodium hypochlorite solution comprising an electrolytic cell, a brine tank located above the electrolytic cell and adapted to supply a predetermined volume of a saturated brine solution to the cell via a gravity feed;

a flow meter adapted for connection to a water supply and through which water is supplied to the electrolytic cell via valve means;

and a controller for controlling operation of the valve means whereby a predetermined volume of water as measured by the flow meter is also supplied to the cell in combination with the brine solution so that the cell operates to produce a sodium hypochlorite solution of a predetermined concentration.

Preferably, the outlet from the brine tank comprises a weir arrangement whereby in operation of the apparatus the predetermined volume of brine supplied to the cell is equal to a volume of water supplied to the brine tank.

Preferably also, water is also supplied to the brine tank via the flow meter and the valve means.

Preferably also, the controller controls operation of the apparatus using a batch process wherein in each batch the controller operates the valve means to supply predetermined volumes of water as measured by the flow meter first to the brine tank and then to the cell or vice versa, the brine tank being adapted to output said predetermined volume of the saturated brine solution to the cell when supplied with the same predetermined volume of water via the flow meter and valve means. The apparatus preferably operates a continuous batch process to produce sequentially as many batches of sodium hypochlorite solution within a given time frame as are required.

Other preferred but non-essential features of the various aspects of the present invention are described in the dependent claims appended hereto.

The present invention will now be described by way of example with reference to the accompanying drawings, in which:—

An electrochlorination apparatus for generating a sodium hypochlorite solution is shown in the drawings and in its basic form as shown in FIGS. 1 to 4 comprises a back panel 1 to which is attached an electrolytic cell 2 that is primarily of conventional construction. The apparatus is supplied with fresh water via an inlet 3 and outputs the sodium hypochlorite solution via an outlet 4. Also attached to the panel 1 is a brine tank 5 that is physically located above the electrolytic cell 2 in order that it can supply a brine solution to the cell via a gravity feed through an outlet 6, an electronic controller 7 that controls operation of the apparatus as a whole including the cell 2 and a power supply 8 for supplying a DC voltage of up to 17V to the cell 2. The power supply 8 is also under the control of the controller 7 and both may be connected to a mains electricity supply, a generator or other suitable electricity supply.

Figure 1:
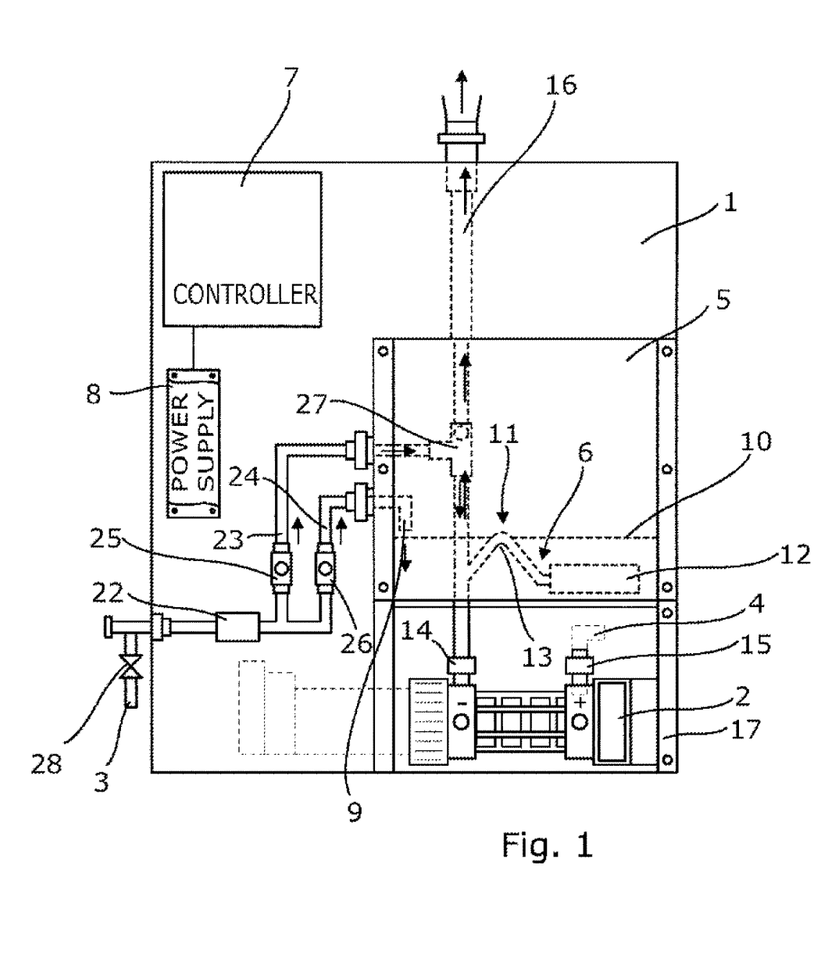
FIG. 1 is a diagram showing schematically a front elevation of an embodiment of apparatus according to the present invention.
Figure 2:
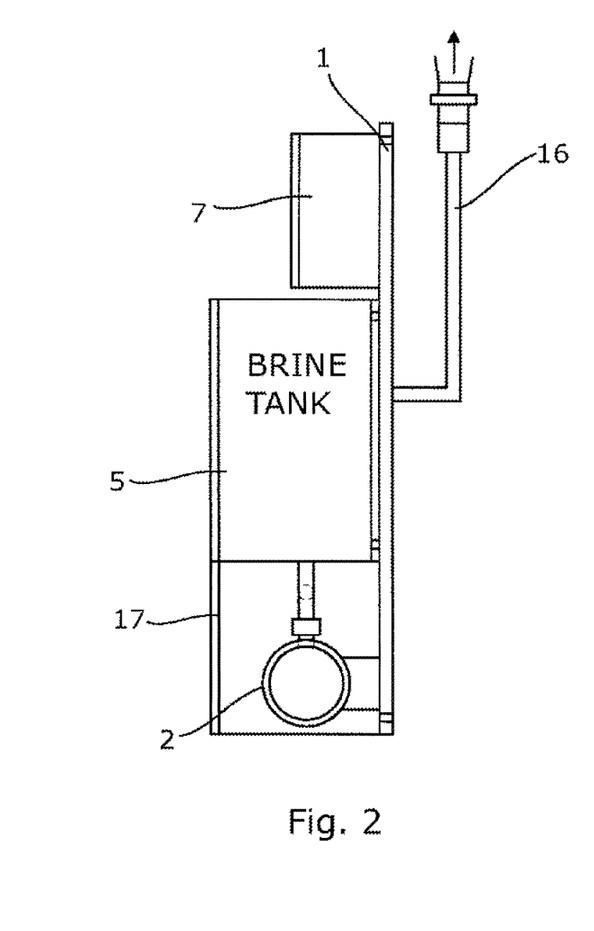
FIG. 2 is a diagrammatic side elevation of the apparatus shown in FIG. 1.

The brine tank 5 is also supplied with fresh water via the inlet 3 through its own fresh water inlet 9 that is connected to the inlet 3 as is further described below. In use of the apparatus the brine tank 5 is filled with salt so that is above a minimum predetermined level 10 and is therefore preferably transparent or has a window so that the level of the salt can be monitored and topped up when required. This is important as the brine solution supplied to the cell 2 should be a saturated brine solution. To this end, the outlet 6 comprises a weir arrangement 11 with a covered but perforated inlet 12 that is located in the tank 5 below the predetermined level 10. The perforated inlet 12 allows the saturated brine solution in the tank 5 to flow out of the tank via the outlet 6 but retains the salt in the tank. The weir arrangement 11 comprises a pipe adjoining the outlet 6 at one end and the perforated inlet at its other end that is substantially horizontally located along the base of the tank 5 but that is provided with an arch forming a weir 13. The weir 13 is located below the level of the fresh water inlet 9 into the tank and is preferably located at about the same level as the minimum salt level 10 to ensure that brine leaving the tank 5 via the outlet 6 is a saturated solution. As is further described below, in use the weir arrangement 11 controls the volume and also the timing of brine supplied to the cell 2 so that a predetermined volume of brine is supplied to the cell via a gravity feed through the outlet 6 whenever the same volume of water is supplied to the brine tank 5 through the inlet 9. This latter volume is also predetermined and controlled by the controller 7.

Figure 4:
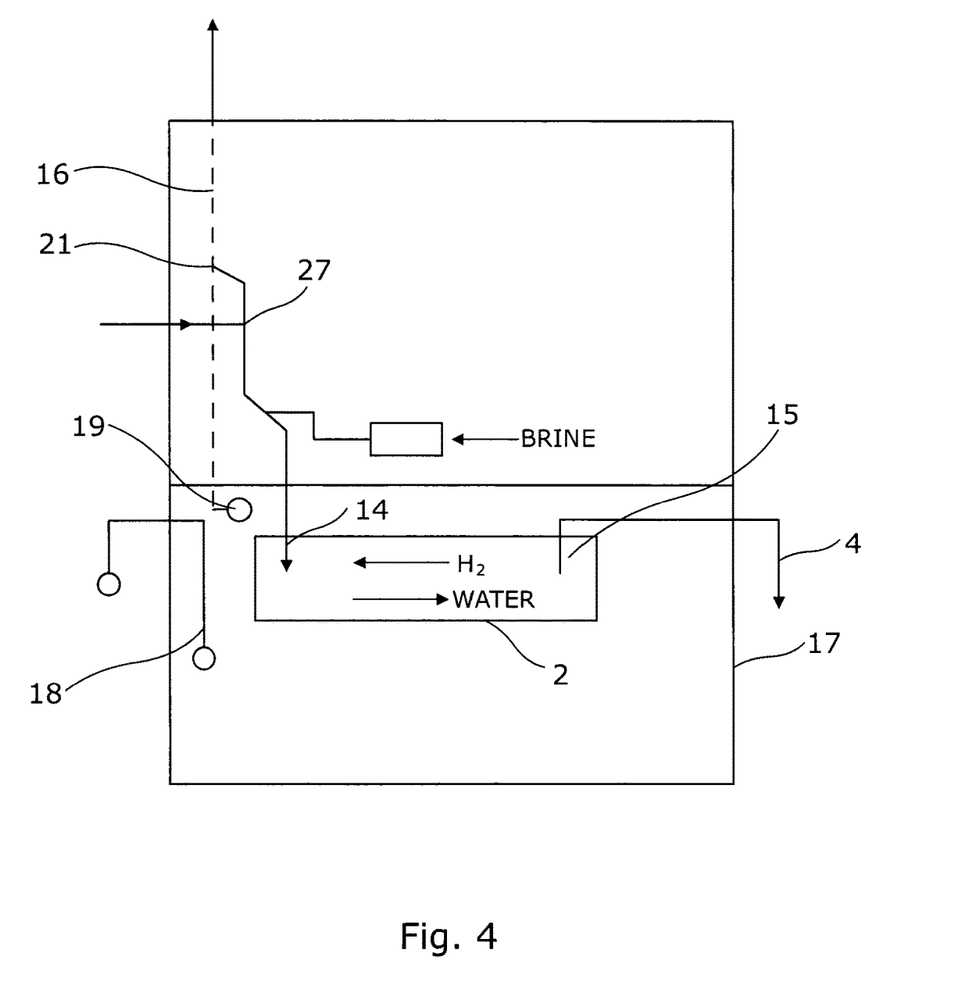
FIG. 4 is a diagram showing in more detail a part of the apparatus concerned with being an arrangement for the venting of hydrogen gas from the apparatus.
Figure 5:
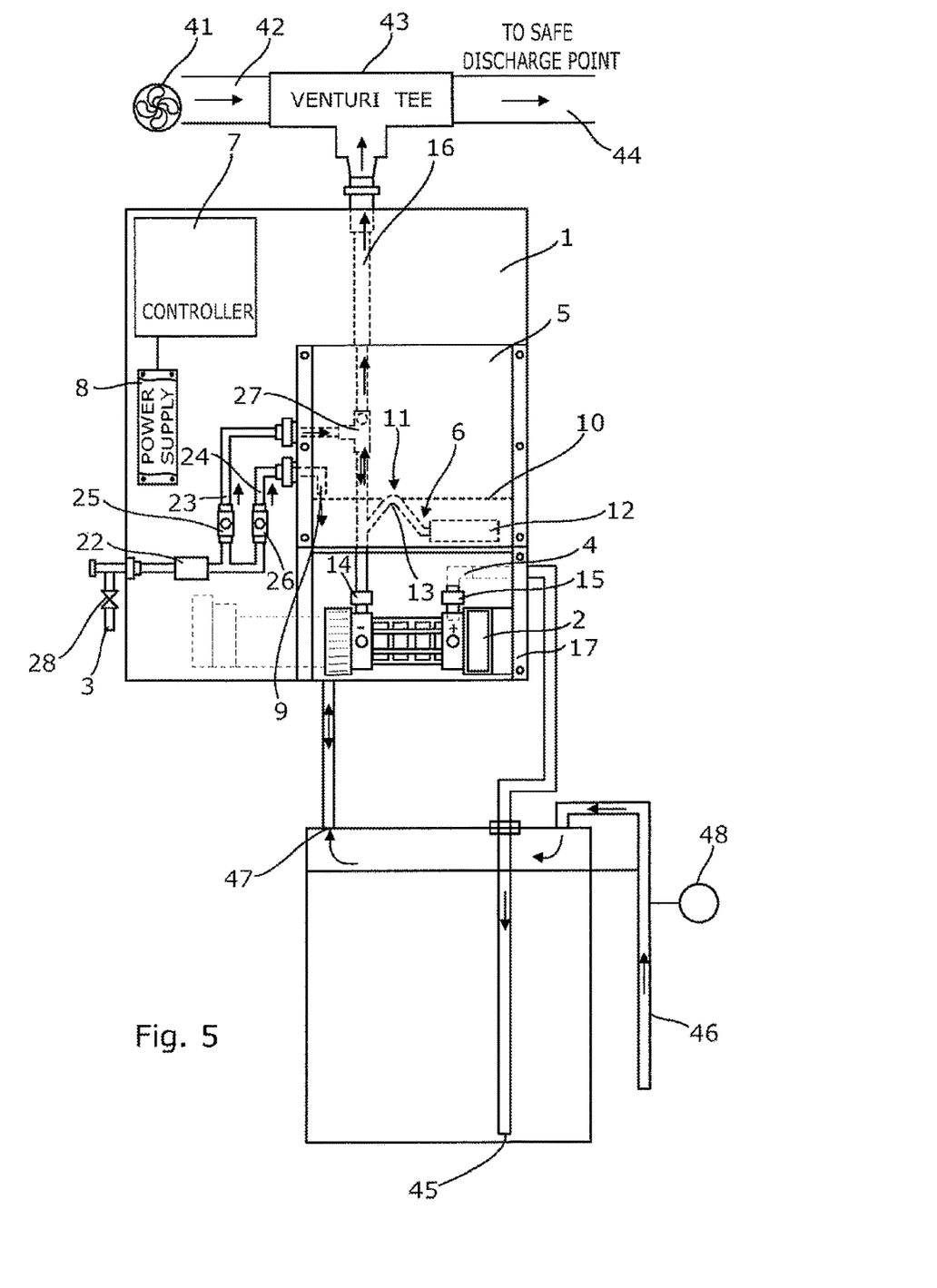
FIGS. 5, 6, 7 and 8 are diagrams similar to FIGS. 1 to 4 respectively but showing a modified arrangement.
Figure 6:
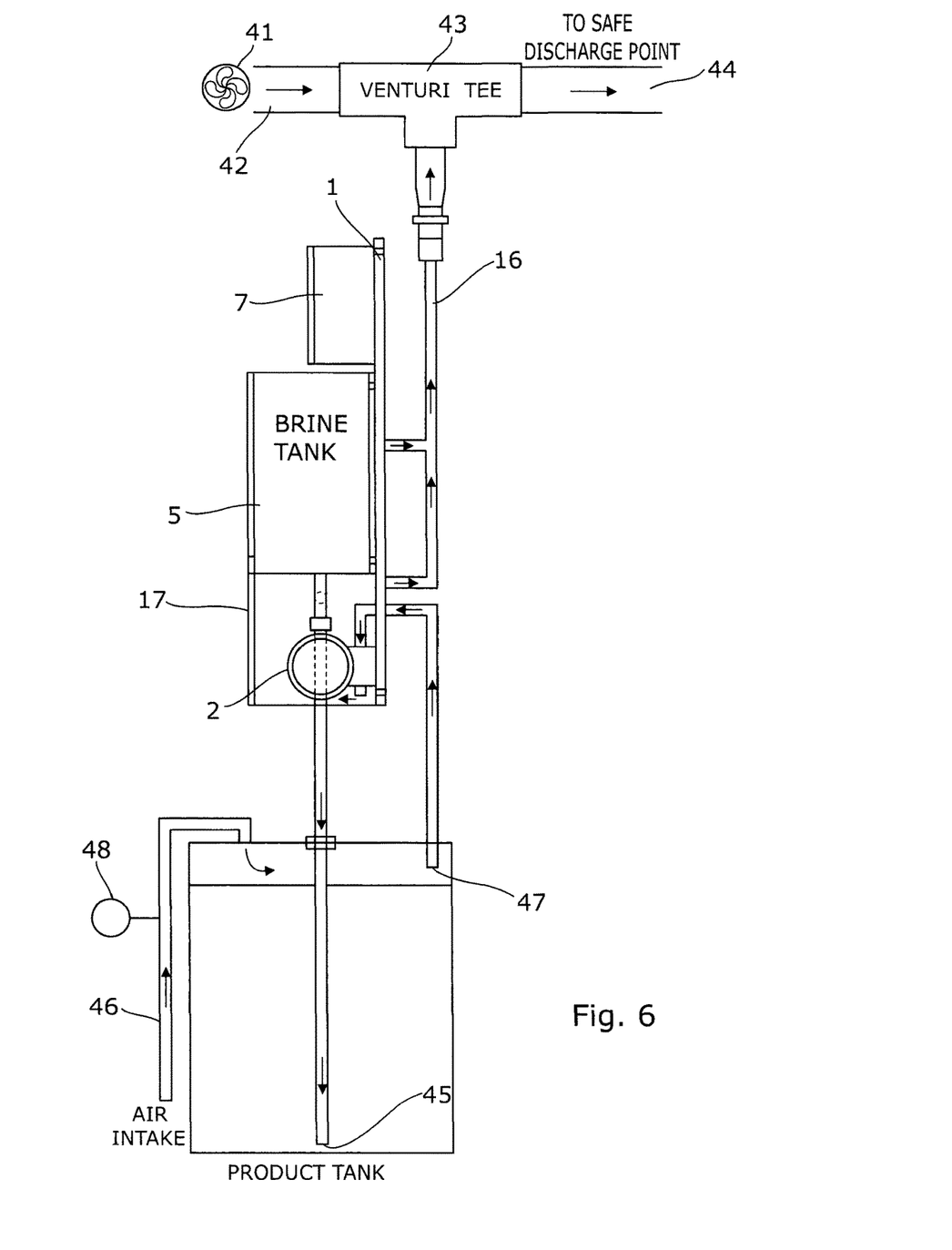
Figure 7:
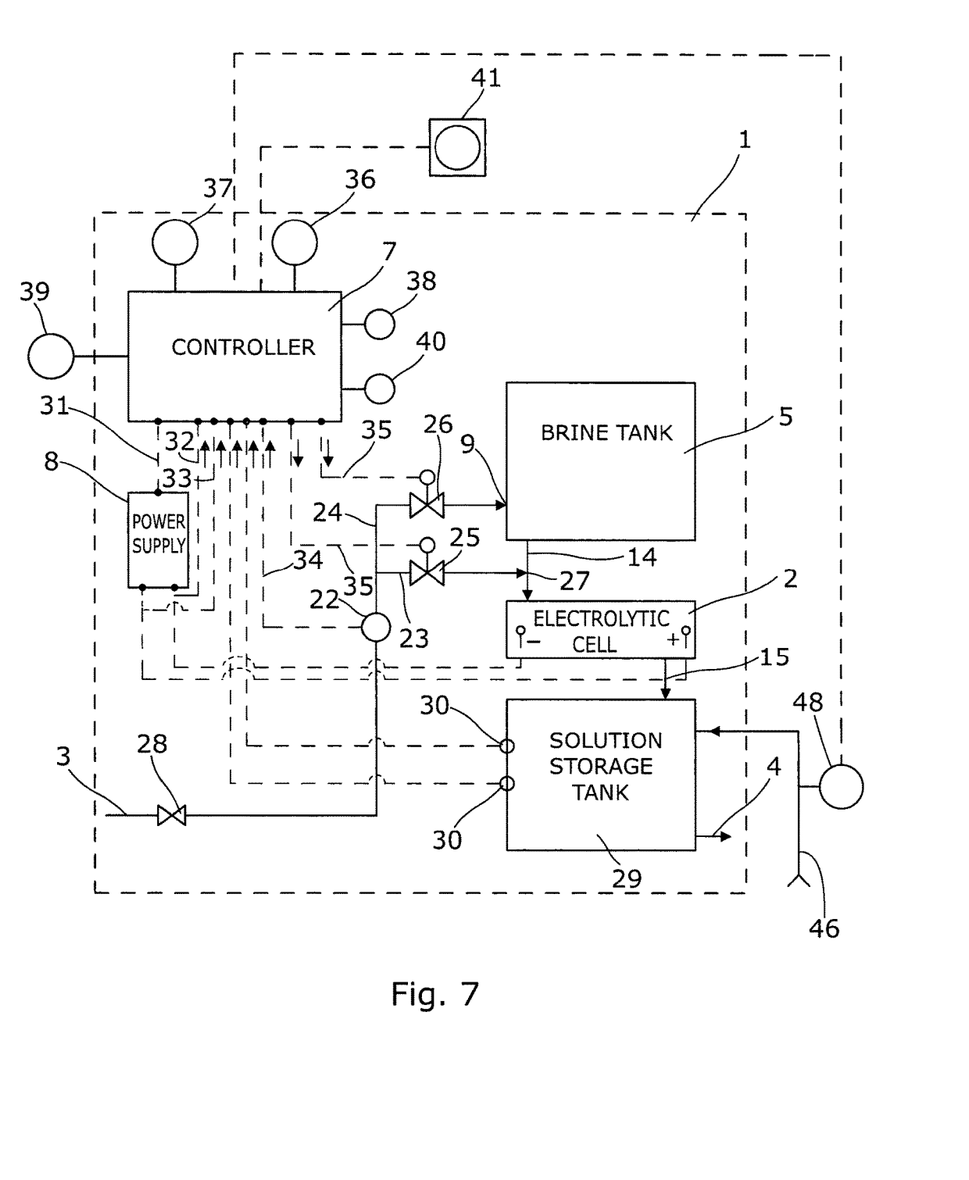
Figure 8:
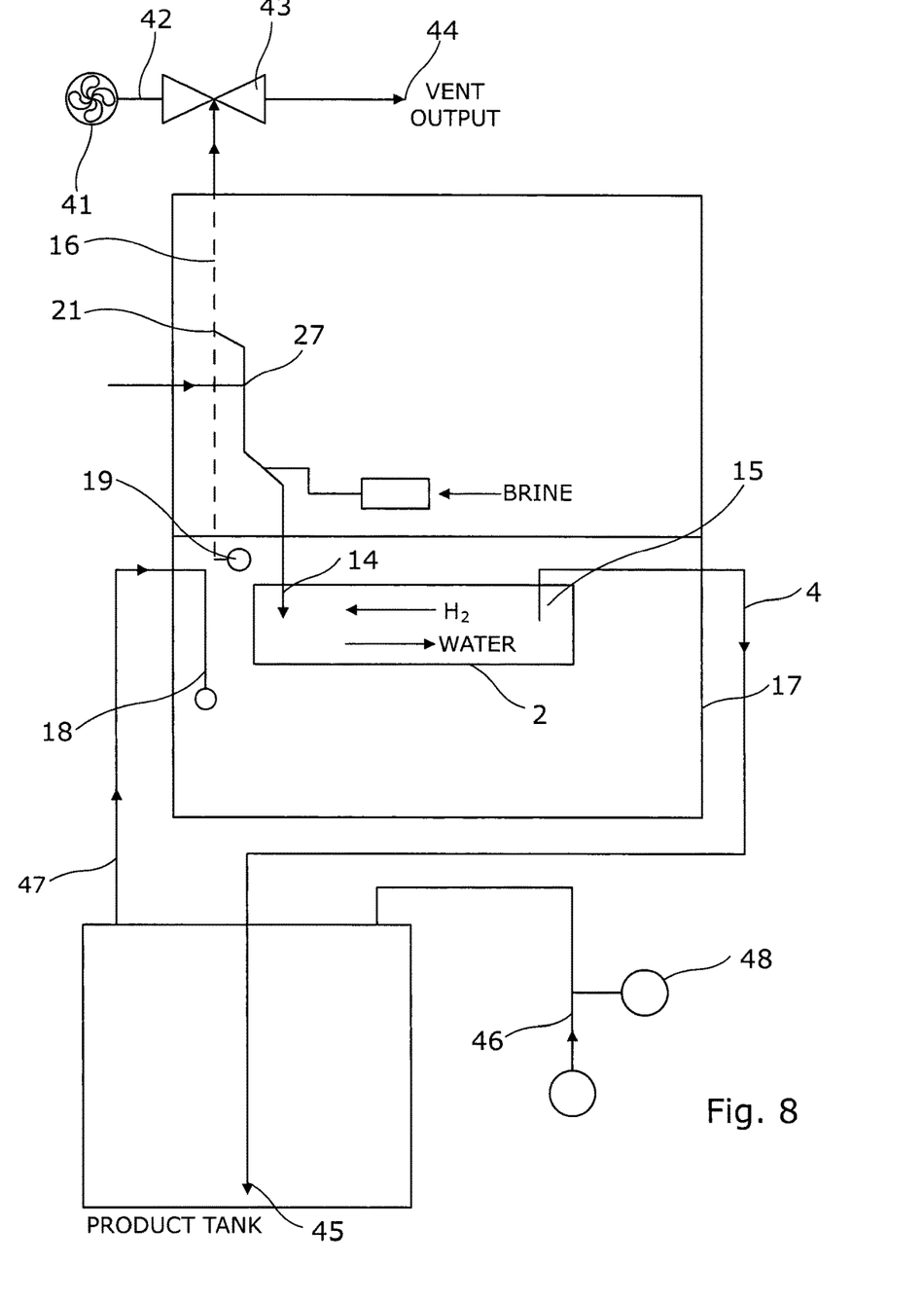

The outlet 6 from the brine tank is connected directly to an inlet 14 that is located adjacent a cathode of the cell 2. Preferably, this inlet 14 blends the brine with a flow of fresh water from the inlet 3 to thereby form a water/brine inlet 14 into the cell 2. At the other end of the cell 2 adjacent an anode is an outlet 15 that is connected directly to the outlet 4 from the apparatus. The ends of the inlet 14 and the outlet 15 are preferably provided with nipples (not shown) and that of the inlet 14 is located vertically higher than that of outlet 14 so that hydrogen gas produced in the cell 2 rises towards it away from the outlet 5 during use. The hydrogen gas is formed from hydrogen ions generated in the cell 2 which in any event tend to preferentially flow to towards the cathode and combine with electrons to form the gas. This gas is then vented via the water/brine inlet 14. Therefore, to vent the hydrogen gas from the apparatus safely, the water/brine inlet 14 to the cell is vertically orientated and connected to a substantially vertically orientated vent 16 that is adapted to be connected to an outlet for safe disposal, for example to the atmosphere outside the building in which the apparatus is installed. In practice, the nipple at the end of the outlet 5 is usually below the liquid level in the cell 2 forming a trap that prevents the hydrogen gas from exiting the cell 2 via the outlet 5.

For safety and to prevent leakage of the hydrogen gas produced, the cell 2 is located within a sealed housing 17 through which the water/brine inlet 14 and the outlet 15 pass. In addition, the housing is provided with an air inlet 18 to permit ingress of a supply of fresh air to cool the cell 2 during use. Preferably, the air leaves the housing 17 through an outlet pipe 19 by convection, thereby drawing in fresh air through the inlet 18. To this end, the air inlet is located at a lower level than the outlet pipe 19 near the bottom of the housing 17. The outlet pipe 19 is preferably also connected to the vent 16. This has the advantage that the hydrogen gas generated in the cell is drawn away from the cell 2 by the warm air currents rising through the pipe 19 and the vent 16. The connection 20 between the water/brine inlet 14 and the vent 16 is therefore located above the connection 21 of the outlet pipe 19 to the vent 16.

In order that the sodium hypochlorite solution generated by the cell 2 has a predetermined concentration it is important that the volumes of fresh water and saturated brine solution are controlled. The way in which this is achieved will now be described.

First, the fresh water inlet 3 for the apparatus is connected to a flow meter 22 that is linked to the controller 7. The output from the flow meter 22 is split into two separate outputs 23, 24 that are each provided with a valve means in the form of solenoid valve 25, 26 respectively, the opening and closing of which is also controlled by the controller 7. The first output 23 is connected via its valve 25 to the inlet 14 that leads into one end of the cell 2. The second output 24 is connected via its valve 26 to the fresh water inlet 9 of the brine tank 5. A connection 27 between the output 23 and the inlet 14 is preferably above a connection between the inlet 14 and the outlet 6 from the brine tank 5, at which connection the fresh water and the brine are blended prior to their flow into the cell 2 (see FIG. 1).

It will be appreciated that other forms of valve means may be provided in place of the two solenoid valves 25, 26, for example a three-way valve.

As indicated above, the inlet 3 is adapted for connection to a supply of fresh water, preferably via a valve 28 that can be used to isolate the supply from the apparatus during maintenance. The supply may be a header tank fed from a mains water supply via a ball cock arrangement or may be a direct feed from a mains water supply. In either case the water supplied to the apparatus is preferably a soft water supply to prevent deposition of scale within the cell 2. In hard water areas, therefore, the water may be passed through a water softening apparatus prior to entering the inlet 3. In both cases it will be appreciated that no pump is used to supply water to the apparatus. The fresh water supplied flows either under mains pressure or by the pressure created by the head of water in a supply tank. Hence, flow through the cell 2 is produced by the force provided by the fresh water and the gravitational flow of the brine solution.

Figure 3:
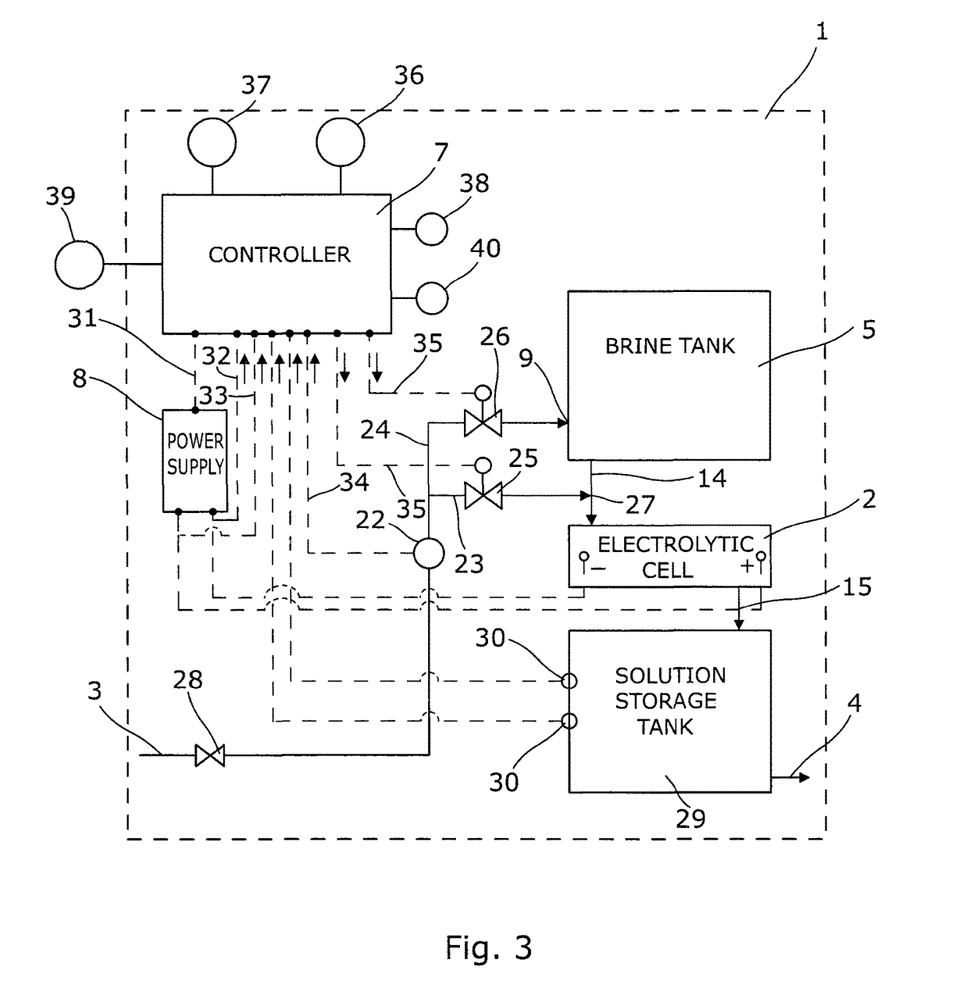
FIG. 3 is a schematic diagram showing a control arrangement for the apparatus shown in FIGS. 1 and 2 but with the addition of a storage tank for the sodium hypochlorite solution produced by the apparatus.

The sodium hypochlorite solution produced in the cell 2 that is output through the outlet 15 may be stored in a tank 29 for future use or may be blended directly into water in a desired application such as, for example, a swimming pool or supply of drinking water. If the solution is stored in a tank 29, then the latter is provided with at least one and preferably two level sensors 30 linked to the controller 7 whereby the controller 7 initiates operation of the apparatus when the level of the solution in the tank 29 falls below a first level and requires topping up and switches off operation of the apparatus when the tank 29 has been filled to an upper level above the first level.

With reference to FIG. 3, the controller 7 is also electrically and operationally linked to the power supply 8 for the cell 2. The power supply 8 receives power from the electricity supply via the controller 7 through a connection 31 and its output is also monitored by the controller 7 via connections 32 and 33. The controller 7 is also connected via connections 34 and 35 respectively to the flow meter 22 and the solenoid valves 25, 26. The controller 7 includes a programmable timer with a keypad/display 36 and a combined on/off and reset button keypad/display 37. The controller 7 preferably uses regular timing pulses from the flow meter to measure the volume of water passing through it so that the keypad/display 36 can be used to control the relative proportions of water supplied to the brine tank 5 and directly to the cell 2 via the flow meter 22. Warning lights 38, 39 and 40 are also provided that respectively indicate when the apparatus is running, when the power supply 8 is supplying power to the cell 2 so that the cell 2 is generating, and if a fault has occurred. For safety, all external sensors and controls that interface with water run on a low DC voltage, typically 24V.

Operation of the apparatus will now be described. On initial operation of the apparatus after installation or maintenance, the brine tank 5 must be filled with salt so that it is above the minimum salt level 10. In practice, the tank 5 is usually completely filled with salt that needs to be topped up on a regular basis. The inlet 3 should also be connected to an appropriate fresh water supply as described above. Then, on initially switching the apparatus on the controller 7 will run a check to see all of its connections are operational and the power supply 8 can supply the required DC voltage. The controller 7 also ensures that the cell 2 is fully flooded with water. Assuming no fault condition is found so that the controller 7 does not need to indicate a fault condition via the warning light 40, the controller 7 will then proceed to charge the apparatus. This involves filling the brine tank 5 with water up to the level of the top of the weir 13 provided in the weir arrangement 12 so that a saturated brine solution can form in the brine tank 5. The timer is usually programmed to provide a delay of at least 30 minutes after initial charging before the controller 7 commences normal operation of the apparatus. The apparatus then operates as follows. First, if there is a storage tank 29 as shown in the embodiment of FIG. 3, the level is checked using the level sensors 30 and should the level be below the first level then the apparatus commences operation. Alternatively, if the apparatus does not have a storage tank and is required to supply a continuous stream of sodium hypochlorite solution then the apparatus also commences operation. Operation of the apparatus is via a continuous batch process. The controller 7 first operates to apply a voltage to the cell 2 via the power supply 8. The controller 7 then opens the valve 26 to allow fresh water to pass along pipe 24 to the brine tank but retains the valve 25 closed. Using the flow meter 22, the controller permits a predetermined volume of water to flow into the brine tank 5. Once this volume has been reached the controller 7 closes the valve 26 and opens the valve 25 to permit a predetermined quantity of fresh water to pass along pipe 23 to the inlet 14 and thence into the cell 2. At the same time, as the brine level in the brine tank 5 has risen above the level of the weir 13, the brine flows through the inlet 12 and over the weir 13 and into the inlet 14 where it is blended with the fresh water so that a combined fresh water and brine mixture enters the cell 2. The use of the flow meter 22 enables the controller to control the ratio of brine to fresh water so that a sodium hypochlorite solution of the required concentration can be produced by the cell 2. For example, production of sodium hypochlorite for swimming pool chlorination will typically require a ratio of between 10 and 15 parts fresh water to 1 part brine dependant on the concentration of sodium hypochlorite required. This can be programmed into the apparatus beforehand using the keypad/display 36. Once the required volume of fresh water has been supplied via the flow meter 22, the controller will close the valve 25 and retain both valves 25, 26 closed for a predetermined period, which is again programmable beforehand using the keypad/display 36.

While the controller 7 preferably first opens the valve 25, retaining the valve 26 closed, and then closes the valve 25 and opens the valve 26 it will be appreciated that it is also possible for this order to be reversed. In both cases the controller 7 controls operation of the apparatus using a batch process wherein in each batch the controller operates the valves 25, 26 to supply predetermined volumes of water as measured by the flow meter first to the brine tank 5 and then to the cell 3 or vice versa.

Once the water/brine mixture enters the cell 2, a sodium hypochlorite solution is generated in the cell 2 which is output via the outlet 15. At the same time hydrogen gas is generated that is vented through the vent 16, as described above. It will be appreciated that the cell will generate heat so that the air flow through the sealed housing via the inlet 18 and outlet 19 will assist in drawing the hydrogen gas out of the cell 2 via the connection 21 of the outlet pipe 19 to the vent 16.

After the predetermined period following closure of the valves 25, 26 has passed, the controller 7 commences the cycle again so that a further batch of water/brine mixture is fed to the cell 2 provided that the upper tank level sensor 30 in the storage tank 29 does not indicate that the tank 29 is full. When the tank 29 is full, the controller 7 retains the valves 25, 26 closed and shuts off power to the power supply 8 for a predetermined period, settable by an operator via the keypad/display 36 to an appropriate time period dependent on the size of the storage tank 29 and the likely run-off demands made on it. Typically, this period will be of the order of 30 minutes. Once this time delay has passed and assuming that the upper level sensor 30 in the tank 29 is not still indicating that the tank 29 is full, then the controller 7 will recommence the batch operations by controlling the valves 25, 26 above to again commence the production of sodium hypochlorite solution using the cell 2.

In a modified arrangement of apparatus as shown in FIGS. 5 to 8, in order to ensure the safe venting of the hydrogen gas produced in the cell 2, a negative pressure ventilation of the apparatus may be provided. This is achieved by providing a fan 41, for example a centrifugal fan, that blows ambient air into an inlet 42, drives it through a venturi 43 and then outputs it through an external outlet 44. The vent 16 is connected to the pipework of the fan arrangement at the venturi 43 so that gases in the vent 16 are sucked out of the vent 16, into the air flow and thence discharged via the outlet 44. It will be appreciated that this creates negative pressure in the cell 2 and its ventilation arrangement to prevent any build-up of hydrogen. Operation of the fan 41 is controlled by the controller 7 so that the fan 41 is operated while the cell 2 is in operation. Also, should a fault develop in the fan 41, the controller 7 can act to shut down operation of the cell 2.

In addition to the foregoing, in those embodiments that include a storage tank 29, the solution inlet into the tank 29 that is attached to the outlet 15 from the cell 2 is arranged to discharge at an outlet 45 close to the base of the tank 29, typically below the level of solution stored therein to create a liquid seal and thereby prevent any hydrogen leakage entering the tank 29 from the cell 2 at any time. To prevent the build-up of chlorinated fumes and any entrained hydrogen in the tank 29, it is ventilated by being provided with a ventilating air inlet 46 and an air outlet 47 that is at a higher level than the inlet 46 and that communicates with the interior of the housing 17 for the cell 2 and thereby communicates with the vent 16. Hence, the interior of the tank above the liquid level is also subjected to the negative pressure created by the fan 41 and venturi 43 and air is drawn through the tank 29 carrying with it any chlorine gas from the sodium hypochlorite solution stored therein. Preferably, a volumetric air flow sensor 48 is located in the inlet 46 and connected to the controller 7. The inlet 46 is effectively the start point of the ventilation system. The controller 7 monitors the output from the sensor 48. Should any pipe blockage, breakage or air leakage occur between the inlet 46 and the venturi 43, this will result in a drop or loss of air flow that is detected by the sensor 48. The controller 7 is programmed to shut down the cell 2 and to stop the generation of the sodium hypochlorite solution if the volumetric air flow through the sensor 48 drops below a predetermined level. In addition, a further safety feature is provided by the air outlet arrangement at the top of the tank 29. Should the upper level sensor 30 in the tank 29 fail, sodium hypochlorite solution would continue to be generated by the apparatus and be in danger of overflowing the tank 29 in the arrangement shown in FIGS. 1 to 4. However, in the modified arrangement the liquid level in the tank 29 would eventually cover the air outlet 47 and cause a loss of air flow. This would be detected by the sensor 48 and again the controller 7 will act to shut down the cell 2 and to stop the generation of the sodium hypochlorite solution.

All of the aforementioned modifications assist in the creation of a fail-safe apparatus. More generally, the apparatus has the advantage that it can be fitted into a small space so that it can be used where there is a space constraint. In addition, it has no requirement for a dosing pump to pump the brine to the electrolytic cell nor for a fresh water pump provided that the apparatus can be attached to a mains water supply or header tank of fresh water. This also reduces the space it requires and keeps running costs down.

The invention claimed is:

1. An electrochlorination apparatus for generating a sodium hypochlorite solution, the electrochlorination apparatus comprising:
   an electrolytic cell;
   a brine tank positioned above said electrolytic cell and adapted to supply a predetermined volume of a saturated brine solution to said electrolytic cell by gravity feed through an outlet, said brine tank having a water inlet, the outlet of said brine tank comprising a weir arrangement with a brine inlet thereto and having a weir that is below a level of the water inlet of said brine tank, said brine tank adapted to be filled with salt to at least a minimum level that is above a level of said brine inlet and at a same level as said weir;
   a flow meter adapted for connection to a water supply and configured to supply a predetermined volume of water and through which water is supplied to the electrolytic cell and to said brine tank, said flow meter connected to the water inlet of said brine tank via a valve; and
   a controller cooperative with the valve so as to control an operation of the valve such that the predetermined volume of water measured by said flow meter is supplied to said electrolytic cell and said brine tank, the predetermined volume of the saturated brine solution supplied to said electrolytic cell being equal to the volume of water supplied to said brine tank through the valve whereby said electrolytic cell produces a sodium hypochlorite solution of a predetermined concentration.

2. The electrochlorination apparatus of claim 1, wherein said controller controls an operation of the electrochlorination apparatus using a batch process wherein in each batch said controller operates the valve to supply the predetermined volumes of water as measured by said flow meter first to said brine tank and then to said electrolytic cell or vice versa, said brine tank being adapted to output said predetermined volume of the saturated brine solution to said electrolytic cell when supplied with the same predetermined volume of water via the flow meter and valve.

3. The electrochlorination apparatus of claim 1, wherein said controller also controls operation of a power supply supplying a DC voltage to said electrolytic cell.

4. The electrochlorination apparatus of claim 1, wherein the concentrated brine solution is supplied to said electrolytic cell via an outlet from the brine tank that blends the brine solution with the flow of water to a water/brine inlet into said electrolytic cell.

5. The electrochlorination apparatus of claim 4, wherein the water/brine inlet to said electrolytic cell is connected to a vent that is adapted to vent hydrogen gas generated in said electrolytic cell from the electrochlorination apparatus.

6. The electrochlorination apparatus of claim 5, wherein the water/brine inlet to the electrolytic cell and the vent are vertically orientated.

7. The electrochlorination apparatus of claim 5, wherein the vent is connected to pipework having a venturi through which ambient air is driven, the venturi applying suction to the vent to draw out contents of the vent for disposal.

8. The electrochlorination apparatus of claim 4, wherein said electrolytic cell comprises an outlet for the sodium hypochlorite solution at an end of said electrolytic cell opposite the water/brine inlet.

9. The electrochlorination apparatus of claim 8, wherein the water/brine inlet to said electrolytic cell is located vertically higher than the sodium hypochlorite solution outlet from said electrolytic cell whereby hydrogen gas generated in said electrolytic cell rises towards and is vented from said electrolytic cell via the water/brine inlet.

10. The electrochlorination apparatus of claim 4, wherein the water/brine inlet is located adjacent a cathode of said electrolytic cell.

11. The electrochlorination apparatus of claim 1, wherein said electrolytic cell is located within a sealed housing that has an air inlet for a supply of fresh air to cool the electrolytic cell during use.

12. The electrochlorination apparatus of claim 11, wherein a water and brine inlet to said electrolytic cell is connected to a vent that is adapted to vent hydrogen gas generated in said electrolytic cell from the electrochlorination apparatus and fresh air is drawn through the air inlet and into the sealed housing by convection and leaves the sealed housing via an air outlet connected to the vent.

13. The electrochlorination apparatus of claim 12, wherein the connection of the water and brine inlet to the vent is located above the connection of the air outlet from the sealed compartment to the vent whereby air currents traveling through the vent draw hydrogen gas generated in electrolytic cell into the vent for disposal.

14. The electrochlorination apparatus of claim 1, further comprising:
   a storage tank for the sodium hypochlorite solution produced by said electrolytic cell; and
   at least one level sensor for the storage tank that is linked to said controller.

15. The electrochlorination apparatus of claim 14, wherein an inlet for the sodium hypochlorite solution into the storage tank discharges at a level close to a base of the storage tank wherein, in use, the level of the discharge is below the level of sodium hypochlorite solution contained within the storage tank.

16. The electrochlorination apparatus of claim 15, wherein the storage tank has ventilation via an air inlet and an air outlet, said air outlet being at a higher level than a level of said air inlet.

17. The electrochlorination apparatus of claim 16, wherein a water and brine inlet to said electrolytic cell is connected to a vent that is adapted to vent hydrogen gas generated in said electrolytic cell from the apparatus and the air outlet from the storage tank communicates with the vent.

18. The electrochlorination apparatus of claim 16, wherein a volumetric air flow sensor is located in the air inlet to the storage tank and is connected to said controller.

19. The electrochlorination apparatus of claim 18, wherein the controller monitors output from the volumetric air flow sensor and acts to shut down operation of said electrolytic cell if a volumetric air flow through the volumetric air flow sensor drops below a predetermined level.

* * * * *